UNITED STATES PATENT OFFICE.

WILLIAM J. MENZIES, OF ST. HELEN'S, ENGLAND.

PROCESS OF SIZING PAPER.

SPECIFICATION forming part of Letters Patent No. 452,143, dated May 12, 1891.

Application filed October 20, 1887. Serial No. 252,906. (No specimens.)

*To all whom it may concern:*

Be it known that I, WILLIAM J. MENZIES, of St. Helen's, county of Lancaster, Kingdom of England, have invented a new and useful Improvement in Processes of Sizing Paper, of which the following is a true and exact description.

My invention relates to that stage of the manufacture of paper in which the pulp in the beating-engine is "sized," and, if desired, filled or weighted with china clay or some other of the substances used for that purpose.

In my patent of June 18, 1889, No. 405,269, I have described the use of aluminate of soda for saponifying the rosin used for a size instead of soda ash or caustic soda, which are now generally used, and also the use of the soluble salts of magnesia and calcium, viz: sulphate and chloride of magnesia and chloride of calcium for precipitating the rosin and forming the sizing instead of sulphate of alumina or alum, the substance generally used. The advantage of using the aluminate of soda to saponify the rosin is that in filling the paper its alumina serves the same purpose as the alumina of the alum generally used, rendering it practicable to dispense with alum entirely, and in the case of its use, together with aluminate of soda, giving an excess of alumina which is a valuable addition to the pulp at this stage of its manufacture. The advantage in using the soluble salts of magnesia and calcium instead of alum to decompose the rosin soap is that these salts are neutral while alum is acid, that they are cheaper than alum, and in case of the magnesia salts the precipitated magnesia is a valuable addition to the pulp.

My present invention is closely allied to the
above process and consists in adding alumi-
nate of soda to the saponaceous solution of rosin mixed with pulp, together with the sulphate or chloride of magnesia, the chloride of calcium, or the sulphate of alumina used to precipitate the rosin from the soap and form with it the sizing compound. Where the above substances are used in solution they should be added separately.

The sulphuric or hydrochloric acid of the above-named salts will combine with the soda resinate or soap, freeing the resin acids, (pinic, abietic, and sylvic,) and also with the soda of the aluminate of soda, precipitating the alumina at the same time the magnesia, lime, or alumina of the sulphate or chloride used is precipitated, and I thus have an excess of alumina or magnesian aluminate which serves as a filler, besides the size formed from the resin in the usual way.

I am reliably informed that the reactions incident to my process may be given as follows, to wit: $2NaR + 2NaAlO_2 + 2MgS.O_4 = 2 Na_2SO_4 + MgR_2 - MgAl_2O_4$; and when aluminum sulphate is used, $12NaR + 6NaAlO_2 + 3 Al_2(SO_4)_3 + 12H_2O = 9Na_2SO_4 + 4AlR_3 + 4Al_2O_3 + (12H_2O)$.

Having now described my invention, what I claim as new, and desire to secure by Letters Patent, is—

In the manufacture of paper, the method of precipitating alumina in the pulp in the beating-engine, which consists in adding to the pulp aluminate of soda, in conjunction with sulphate of alumina or its equivalents, the soluble salts of magnesia or calcium.

WILLIAM J. MENZIES.

Witnesses:
FRANK A. MULLIKIN,
JOSHUA MATLACK, Jr.